United States Patent [19]

Hanazuka et al.

[11] Patent Number: 5,340,847
[45] Date of Patent: Aug. 23, 1994

[54] CURABLE SILICON COMPOSITION

[75] Inventors: Yasuo Hanazuka, Hachioji; Ikuzo Usami, Tsukui; Kazuyuki Chiba, Kanagawa; Noriko Mizutani, Hachioji, all of Japan

[73] Assignee: Three Bond Co., Ltd., Tokyo, Japan

[21] Appl. No.: 97,368

[22] Filed: Jul. 23, 1993

Related U.S. Application Data

[63] Continuation-in-part of Ser. No. 964,717, Oct. 22, 1992, abandoned.

[30] Foreign Application Priority Data

Oct. 23, 1991 [JP] Japan .................................. 3-337494

[51] Int. Cl.$^5$ ................................ C08F 2/46
[52] U.S. Cl. ......................... 522/11; 522/12; 522/18; 522/24; 522/25; 522/28; 522/33; 522/46; 522/48; 522/69; 522/99
[58] Field of Search ............ 522/99, 24, 25, 28, 522/33, 18, 46, 48, 69, 11, 12

[56] References Cited

U.S. PATENT DOCUMENTS 5,212,211  5/1993  Welch, II, et al. .................. 522/99

FOREIGN PATENT DOCUMENTS 315341A   5/1989  European Pat. Off. .
2111515A  12/1981 United Kingdom .

Primary Examiner—Melvyn I. Marquis
Attorney, Agent, or Firm—Scully, Scott, Murphy & Presser

[57] ABSTRACT

A composition useful as a liquid gasket, having high working efficiency and high initial pressure resistance, is provided. The composition, characterized by being curable by ultraviolet light and by moisture, includes (a) a polysiloxane containing, on at least one molecular end, at least one group selected from the group consisting of (meth)acryl, glycidyl, propenyloxysilyl and thiol; (b) a polyorganosiloxane having silanol groups at both molecular ends; (c) a polyorganosiloxane having, on at least one molecular end, a hydrolyzable group; (d) a photopolymerization catalyst; and (e) a condensation catalyst.

5 Claims, No Drawings

CURABLE SILICON COMPOSITION

CROSS-REFERENCE TO RELATED APPLICATION

This is a continuation-in-part of U.S. patent application Ser. No. 07/964,717 filed Oct. 22, 1992 and now abandoned.

BACKGROUND OF THE INVENTION

The present invention relates to a curable silicone composition for a liquid gasket and more particularly a composition for a liquid gasket which is used as FIPG (Formed In-Place Gasket) in an assembling process of automobile parts, electric and electronic parts, etc. and which increases in viscosity upon radiation of ultraviolet ray thereto and is superior in both working efficiency and initial pressure resistance at the time of mounting (the pressure resistance is checked in the assembling process before complete curing of the liquid gasket).

In connection with using as FIPG, there is known a method wherein, in a moisture-curable RTV silicone comprising a one-pack type condensation-curable composition which contains an organosiloxane as a main component, the molecular weight of a polysiloxane is made larger or the amount of an inorganic filler to be incorporated in the composition is increased to attain an increase in viscosity for obtaining a high initial pressure resistance at the time of mounting. It is also known that, in an anaerobic adhesive, partial curing is allowed to take place by the radiation of ultraviolet ray, followed by anaerobic curing (Japanese Patent Laid Open No. 104976/1983). It is also known that an ultraviolet-curing resin is allowed to cure completely at a flange interface and thereafter another flange is mounted (Japanese Patent Laid Open No. 77597/1987).

However, a sealing material which has been made high in viscosity for attaining a high initial pressure resistance causes a discharge pump or a dispenser of a coating machine to be overloaded, thus making it difficult to form a bead precisely and efficiently. The anaerobic adhesive disclosed in Japanese Patent Laid Open No. 104976/1983 involves problems; for example, it does not cure in thick film, a protruded portion from a flange portion does not cure, and it is difficult to cure in flanges (plastic parts) other than metal flanges. Further, the gasket layer pre-formed at a flange interface, which is disclosed in Japanese Patent Laid Open No. 77597/1987, cannot afford a high pressure resistance unless clamping is made strongly because it is not bonded to another flange, and a too strong clamping may cause stress-cracking of the gasket layer.

It is the object of the present invention to overcome the above-mentioned problems of the prior art.

SUMMARY OF THE INVENTION

The present invention resides in a silicone composition for a liquid gasket, having two curing properties which are an ultraviolet-curing property and a moisture-curing property, and characterized by containing:

(a) 5 to 50 wt % of a polysiloxane containing, on at least one molecular end, a radical selected from the group consisting of (meth)acryl, glycidyl, propenyloxysilyl and thiol;

(b) a polyorganosiloxane having silanol groups at both molecular ends;

(c) a polyorganosiloxane containing, on at least one molecular end, a hydrolyzable group having the structural formula $-SiR_aX_{3-a}$ and the repeating unit having the structural formula

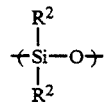

wherein $R^2$ are the same or different and are alkyl or aryl; R is alkyl, halogen-substituted alkyl or halogen-substituted aryl; X is a hydrolyzable group selected from the group consisting of acyloxy, alkoxy, ketoxime, amino, amido and alkenyl; and a is 0 or 1;

(d) a photopolymerization catalyst which is a radical-forming catalyst when component (a) is a polysiloxane having a (meth)acryl group at at least one molecular and or an onium salt photopolymerization catalyst when component (a) is a polysiloxane having a glycidyl or a propenyloxysilyl groups at at least one molecular end; and (e) a condensation catalyst.

DETAILED DESCRIPTION OF THE INVENTION

In the present invention, the component (a) is a polysiloxane having a specific functional group at a molecular end which functional group possesses a polymerizing property on ultraviolet radiation. As the end functional group there is used any of the following:

| | |
|---|---|
| (meth)acryl | $CH_2=C-C-O-$ with R and O (R = H or CH$_3$) |
| glycidyl | $CH_2\!\!-\!\!\!-\!\!CH\!\!-\!\!CH_2-$ with O bridge |
| propenyloxysilyl | $(CH_2=C-O-)_3-Si-$ with $CH_3$ |
| thiol | $H-S-$ |

A typical example of the polysiloxane having such functional group possesses the following structural formula:

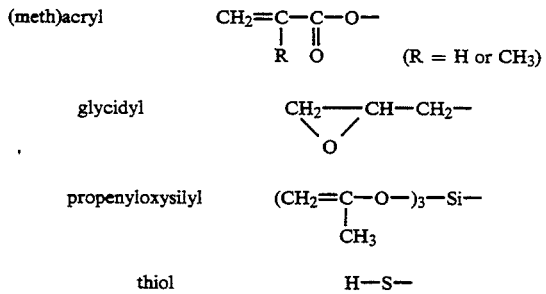

wherein $R^1$ is a divalent hydrocarbon group having 2 to 3 carbon atoms, preferably ethylene or propylene, $R^2$, which are the same or different, are each alkyl or aryl, preferably methyl, substituted alkyl, aryl, substituted aryl, alkoxy, or phenyl, n is an integer of 100 to 700, and X is the foregoing end group.

The component (a) can be prepared by a known method. For example, according to tile technique disclosed in Japanese Patent Laid Open No. 215009/1985, a polysiloxane having functional groups at both ends thereof can be prepared by a condensation reaction of a polysiloxane having silanol end group and also having an ultraviolet-curing functional group in the molecule.

Further, according to the technique disclosed in Japanese Patent Laid Open No. 319516/1989, a polysiloxane having functional groups at both ends can be prepared by a hydrosilylation reaction of a polysiloxane having vinyl end group with an organosilane having both an ultraviolet-curing functional group and hydrogen in one molecule, in the presence of a platinum catalyst. In the same publication it is also disclosed that such polysiloxane can also be prepared by a hydrosilyl reaction of a hydrogen polysiloxane and an organosilane having both vinyl group and an ultraviolet-curing functional group in one molecule.

The component (a) is used in an amount of 5-50 wt % of the total weight of the composition. If the amount thereof is less than 5%, the viscosity of the system will not exhibit a substantial rise even upon radiation of ultraviolet ray. And it is larger than 50%, the radiation of ultraviolet ray will cause a too large increase of viscosity or a too hard condition of the surface layer, resulting in breakage of the surface coating at the time of mounting a flange or failure to bond to one flange interface, thus leading to deterioration of the pressure resistance.

As the polysiloxane having silanol groups at both molecular ends, which is used as component (b) in the present invention, there usually is employed one represented by the following structural formula:

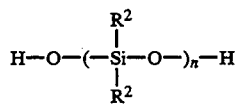

wherein the $R^2$s, which are the same or different, are alkyl or aryl, preferably methyl, substituted alkyl, aryl, substituted aryl, alkoxy, or phenyl, and n is an integer corresponding to a degree of polymerization at which this polysiloxane has a viscosity of 100 to 1,000,000 cps, preferably 1,000 to 50,000 cps, at 25° C.

Component (c), the polyorganosiloxane containing, on at least one molecular end, a hydrolyzable group having the structural formula $-SiR_aX_{3-a}$ and the repeating unit having the structural formula

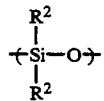

preferably is a polysiloxane having the structural formula

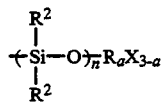

wherein $R^2$, which are the same or different and are each alkyl or aryl; R is alkyl, halogen-substituted alkyl or halogen-substituted aryl; X is a hydrolyzable group selected from the group consisting of acyloxy, alkoxy, ketoxime, amino, amido and alkenyl and is 0 or 1; and n is an integer of 100 to 700.

Components (d) and (e) are employed in the present invention as a photopolymerization catalyst and a condensation catalyst, respectively. The photopolymerization catalyst is for polymerization of component (a), while the condensation catalyst is for moisture condensation polymerization of the silanol terminated polysiloxane of component (b) and the hydrolyzable group-containing polyorganosiloxane of component (c).

As the condensation catalyst there may be used a known catalyst. Examples are metallic salts of organocarboxylic acids, organic titanic acid esters, organotitanium compounds, alkoxyaluminum compounds, aminoalkyl substituted alkoxysilanes, amine compounds and salts thereof, lower fatty acid salts of alkali metals, dialkylhydoxylamines, guanidine compounds and guanidyl group-containing silanes or siloxanes. The amount of the condensation catalyst to be used is 0.01 to 5, preferably 0.1 to 3, parts by weight based on 100 parts by weight of the silanol terminated polysiloxane which is used as component (b).

As the photopolymerization catalyst, any of radical forming catalysts and onium salts is used suitably depending to the kind of the functional group which polymerizes on ultraviolet radiation. In the case where the functional group is (meth)acryl group, there is used a known photosensitizer which forms a radical under the radiation of ultraviolet ray, namely, a radical forming photopolymerization catalyst, such as, for example, acetophenone, benzophenone, 4-hydroxydiphenyl or 4-nitroaniline. In the case of glycidyl or propenyloxysilane, there is used a known photosensitizer which forms a cation under the radiation of ultraviolet ray, namely, an onium-based photopolymerization initiator, such as, for example, onium salts of Group Va, VIa and VIIa elements in the Periodic Table. And in the case of thiol, there is used a vinyl terminated polysiloxane. The amount of the photopolymerization catalyst to be used is 0.1 to 5 parts by weight based on 100 parts by weight of the polysiloxane which is used as component (a).

In the composition of the present invention containing the above components as essential components there may be incorporated a suitable known filler, e.g. fumed silica, hydrophobic silica or calcium carbonate, in a predetermined amount.

In using the ultraviolet-curing composition of the present invention, it is first applied to a flange, then ultraviolet ray is radiated thereto for increasing the viscosity, thereafter another flange is mounted thereto, followed by standing, whereby the composition is moisture-cured into a rubbery elastomer.

Thus, the silicone composition of the present invention exhibits an extreme increase in its viscosity upon exposure to ultraviolet ray after applied to a flange portion, thereby affording an excellent initial pressure resistance. Since the viscosity of the polysiloxane composition in the present invention is low prior to exposure to ultraviolet ray, the discharge pressure of a coating machine used is small, so the pump and dispenser thereof are not overloaded and it becomes possible to form a precise bead. Thus, there is attained a high working efficiency. Further, even after assembly of the flanges, the composition which has been increased in viscosity by the radiation of ultraviolet ray undergoes a polymerization reaction in the presence of moisture, thereby providing a cured, heat-resistant gasket material of a rubbery elastomer similar to the conventional gasket material of silicone rubber, which gasket material obtained is employable even under severe conditions.

EXAMPLES

Preparation 1

A polysiloxane having methacryloxypropyl groups at both ends was prepared by a condensation reaction of a methacryloxypropylaminosilane and a silanol terminated polysiloxane according to the method disclosed in Example 1 of Japanese Patent Laid Open No. 215009/1985.

Preparation 2

A polysiloxane having propenyloxysilyl groups at both ends was prepared by a hydrosilylation reaction of a hydrogen polysiloxane and a viniltripropenyloxysilane according to the method disclosed in Example 2 of Japanese Patent Laid-Open No. 319516/189.

Preparation 3

A polysiloxane having propylene oxide groups at both ends was prepared by a condensation reaction of a propylene oxide aminosilane and a silanol terminated polysiloxane according to the same method as that disclosed in Example 1 of Japanese Patent Laid Open No. 215009/1985.

Preparation 4

7 parts by weight of a vinyltris(methylethoxyketoxime)silane (trade name: V5050, a product of Chisso Corporation) was added, under nitrogen purge, relative to 100 parts by weight of a silanol terminated polysiloxane (molecular weight: 18,000, trade name: CPS345.5, a product of HULS Co. ).

By a hydrolysis condensation reaction there was obtained a mixture of the silanol terminated polysiloxane and a polysiloxane having one or more methylethylketoxime groups as end hydrolyzable groups.

Examples 1-4 and Comparative Example 1

Ultraviolet-curing silicone compositions were prepared at the composition ratios described in Table 1. The samples thus obtained were each applied to a flange which is defined in the pressure testing method for liquid gasket in JIS K 6820, then about 500 mj of ultraviolet ray was radiated for increasing the viscosity, immediately followed by mounting of another flange and measurement of both an initial pressure resistance and a pressure resistance after standing 24 hours.

As a result, it turned out that the compositions prepared according to the process of the present invention were superior in initial pressure resistance to a conventional RTV silicone (trade name: TB1217, a product of Three Bond Co.).

TABLE 1

| Component | Wt % Example 1 | Example 2 | Example 3 | Example 4 | Comparative Example 1 |
|---|---|---|---|---|---|
| Methacryloxypropyl terminated polysiloxane, Preparation 1 | 30 | | | | |
| Propylene oxide terminated polysiloxane, Preparation 3 | | 30 | | | |
| Propenyloxysilyl terminated polysiloxane, Preparation 2 | | | 30 | | |
| Propylhydrosulfide terminated polysiloxane, (trade name: TFC7770, a product of Toshiba Silicone) | | | | 30 | |
| Mixture of Silanol terminated polysiloxane and Ketoxime terminated polysiloxane, Preparation 4 | 60 | 60 | 60 | 60 | |
| Aerosil 972 (silica powder) (Nippon Aerosil) | 4 | 4 | 4 | 4 | |
| Dibutyltin octate (condensation catalyst) | 1 | 1 | 1 | 1 | |
| Benzophenone (photopolymerization catalyst) | 1 | | | 1 | |
| $Ph_2I^+ \cdot SbF_6$ (photopolymerization catalyst) | | 1 | 1 | | |
| RTV Silicone (trade name: TB1217, a product of Three Bond Co.) | | | | | 100 |
| Initial Pressure Resistance after ultraviolet radiation | 1.3 | 1.5 | 1.3 | 1.0 | 0.3 |
| Pressure Resistance after moisture-curing (after 24 hours) | 18 | 17 | 18 | 16 | 19 |

Examples 5-7 and Comparative Examples 2, 3

Ultraviolet-curing silicone compositions were prepared at the composition ratios described in Table 2. The samples thus obtained were each applied to a flange which is defined in the pressure testing method for liquid gasket in JIS K 6820, then about 500 mj of ultraviolet ray was radiated for increasing the viscosity, and the degree of the increase in viscosity was checked by observing appearance with the naked eye. After the mounting of another flange, there were measured both an initial pressure resistance and a pressure resistance after standing 24 hours.

As a result, it turned out that an outstanding effect was exhibited when the proportion of ultraviolet-curing silicone in the composition was in the range of 5 to 50 wt %.

TABLE 2

| Component | Comparative Example 2 | Example 5 | Example 6 | Example 7 | Comparative Example 3 |
|---|---|---|---|---|---|
| Methacryloxypropyl terminated polysiloxane, Preparation 1 | 3 | 5 | 30 | 50 | 60 |
| Mixture of Silanol terminated | 91 | 89 | 64 | 44 | 34 |

TABLE 2-continued

| Component | Comparative Example 2 | Example 5 | Example 6 | Example 7 | Comparative Example 3 |
|---|---|---|---|---|---|
| polysiloxane and Ketoxime terminated polysiloxane, Preparation 4 | | | | | |
| Aerosil 972 (silica powder) (Nippon Aerosil) | 4 | 4 | 4 | 4 | 4 |
| Dibutyltin octate (condensation catalyst) | 1 | 1 | 1 | 0.5 | 0.5 |
| Benzophenone (photopolymerization catalyst) | 1 | 1 | 1 | 1.5 | 1.5 |
| State after Ultraviolet Radiation | no increase in viscosity | slight increase in viscosity | increase in viscosity | great increase in viscosity, film is present | cured*1 |
| Initial Pressure Resistance after ultraviolet radiation | 0.3 | 0.7 | 1.3 | 3.7 | 0.3 |
| Pressure Resistance after moisture-curing (after 24 hours) | 18 | 18 | 18 | 12 | 0.6 |
| Overall Evaluation | X | O | O | O | X |

*1"Cured" indicates a nearly completely solidified state as a result of ultraviolet radiation.

Evaluation Test

Samples were each applied to a 25 mm wide steel plate or polyacetal plate and about 3,000 mj of ultraviolet ray was radiated. Then, another steel plate or polyacetal plate was mounted to the said steel or polyacetal plate through a spacer having a predetermined thickness to obtain a test piece having a predetermined clearance and with the sample present therein. After standing 24 hours at room temperature, the test piece was peeled off and the curing property of the sample present inside was checked with the naked eye. The results obtained are as shown in Table 3.

TABLE 3

| | Film curing property on polyacetal resin plate and steel plate | | | |
|---|---|---|---|---|
| | Methacryloxypropenyl terminated polysiloxane Example 1 | | Ultraviolet-curing anaerobic gasket Comparative Example 4 | |
| Film Thickness (mm) | Polyacetal | Steel Plate | Polyacetal | Steel Plate |
| 0.3 | cured | cured | uncured | cured |
| 0.3 | cured | cured | uncured | cured |
| 0.5 | cured | cured | uncured | uncured |
| 1.0 | cured | cured | uncured | uncured |

Effects of the Invention

The ultraviolet-curing silicone composition of the present invention exhibits the following excellent effects.

① Since the composition when applied is low in viscosity, the application thereof can be effected even if the pump pressure of a coating machine is small.

② Upon exposure to ultraviolet ray of the composition to increase its viscosity, there is obtained an initial pressure resistance. Therefore, it is possible to conduct a pressure test immediately after the mounting of another flange.

③ At the time of mounting of another flange, the composition has an increased viscosity but is uncured. It bonds to a pair of flanges and cures, thus affording a high pressure resistance.

④ Since the composition moisture-cures between the flange faces, it can cure completely even when the gasket layer is thick, or at a protruded portion of flange, or even between plastic or coated flanges.

The above embodiments and examples are given to illustrate the scope and spirit of the present invention. These embodiments and examples will make apparent, to those skilled in the art, other embodiments and examples. These other embodiments and examples are within the contemplation of the present invention. Therefore, the present invention should be limited only by the appended claims.

What is claimed is:

1. A silicone composition which is both ultraviolet-curable and moisture-curable, comprising:
   (a) 5% to 50% by weight of a polysiloxane containing, on at least one molecular end, a radical selected from the group consisting of (meth)acryl, glycidyl and propenyloxysilyl;
   (b) a polyorganosiloxane having silanol groups at both molecular ends;
   (c) a polyorganosiloxane containing, on at least one molecular end, a hydrolyzable group having the structural formula $-SiR_aX_{3-a}$ and the repeating unit having the structural formula

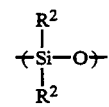

where $R^2$ are the same or different and are alkyl or aryl; R is alkyl, halogen-substituted alkyl or halogen-substituted aryl; X is a hydrolyzable group selected from the group consisting of acyloxy, alkoxy, ketoxime, amino, amido and alkenyl; and a is 0 or 1;
   (d) a photopolymerization catalyst which is a radical-forming photopolymerization catalyst when component (a) is a polysiloxane having a (meth)acryl group at at least one molecular end or an onium salt photopolymerization catalyst when component (a) is a polysiloxane having a glycidyl or a propenyloxysilyl group at at least one molecular end; and
   (e) a condensation catalyst selected from the group consisting of metallic salts of organocarboxylic acids, organic titanic acid esters organotitanium compounds, alkoxyaluminum compounds, aminoalkyl substituted alkoxysilanes, salts of amine compounds, lower fatty acids salts of alkali metals, dialkylhydroxylamines, guanidyl group-containing silanes and guanidyl group-containing siloxanes.

2. A silicone composition in accordance with claim 1 wherein component (c) is a polyorganosiloxane having the structural formula

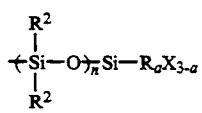

where n is an integer of 100 to 700.

3. A silicone composition in accordance with claim 1 wherein said component (a) is a polysiloxane having a (meth)acryl group at at least one molecular end and said component (d) is a radical forming photopolymerization catalyst selected from the group consisting of acetophenone, benzophenone, 4-hydroxydiphenyl and 4-nitroaniline.

4. A silicone composition in accordance with claim 1 wherein said component (a) is a polysiloxane having a glycidyl or a propenyloxysilyl group at at least one molecular end and said component (d) is an onium salt of an element of Group Va, VIa or VIIa of the Periodic Table of the Elements.

5. A silicone composition in accordance with claim 1 wherein said condensation catalyst is employed in a concentration of between 0.01 and 5 parts by weight, based on 100 parts by weight of component (b).

* * * * *